US008792885B2

(12) United States Patent
Chen et al.

(10) Patent No.: US 8,792,885 B2
(45) Date of Patent: Jul. 29, 2014

(54) METHOD AND SYSTEM FOR PROVISIONING A WIRELESS DEVICE

(75) Inventors: Yue Chen, Bellevue, WA (US); Alan W. Shen, Seattle, WA (US); Daniel Stein, Palm Beach Gardens, FL (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 12/060,771

(22) Filed: Apr. 1, 2008

(65) Prior Publication Data

US 2009/0068999 A1    Mar. 12, 2009

Related U.S. Application Data

(63) Continuation of application No. 10/999,906, filed on Nov. 30, 2004, now Pat. No. 7,353,017.

(51) Int. Cl.
*H04W 4/00* (2009.01)

(52) U.S. Cl.
USPC ............... 455/434; 455/432.1; 455/432.3; 455/435.1; 455/435.2; 455/450

(58) Field of Classification Search
CPC ..... H04W 48/16; H04W 48/17; H04W 48/18; H04W 48/20; H04W 88/06
USPC ............ 455/428, 432.1–439, 445–452.2
See application file for complete search history.

(56) References Cited

U.S. PATENT DOCUMENTS

| 6,038,438 | A | 3/2000 | Beeson et al. |
| 7,139,587 | B2 * | 11/2006 | Ishii ........................... 455/552.1 |
| 7,353,017 | B2 | 4/2008 | Chen et al. |
| 7,433,929 | B2 * | 10/2008 | Guilford et al. ............. 709/217 |
| 2002/0193125 | A1 * | 12/2002 | Smith .......................... 455/458 |
| 2004/0102192 | A1 | 5/2004 | Serceki |
| 2004/0214524 | A1 * | 10/2004 | Noda et al. ................... 455/41.2 |
| 2004/0242193 | A1 * | 12/2004 | Olah ............................ 455/406 |
| 2005/0190716 | A1 * | 9/2005 | Buckley et al. .............. 370/328 |
| 2006/0045272 | A1 * | 3/2006 | Ohaka .......................... 380/270 |
| 2006/0194582 | A1 * | 8/2006 | Cooper ......................... 455/436 |

* cited by examiner

*Primary Examiner* — Dai A Phuong
(74) *Attorney, Agent, or Firm* — John Jardine; David Andrews; Micky Minhas

(57) ABSTRACT

A method and system for controlling the provisioning of a device with information for accessing services of a wireless service provider via a wireless network is provided. The provisioning system initially stores automatic provisioning information on the device that includes the identification of wireless service providers that have the capability to automatically provision the device. When a user of the device wants to subscribe to a service of a service provider, the provisioning system requests an automatic provisioning service of the service provider to provide information describing available services and information needed to subscribe to those services. When the user selects a service and provides the needed information, the provisioning system retrieves provisioning information for the selected service from the service provider. The provisioning system stores the provisioning information on the device so that the device can then be used to access the selected service of the service provider.

34 Claims, 4 Drawing Sheets

METHOD AND SYSTEM FOR PROVISIONING A WIRELESS DEVICE

CROSS REFERENCE TO RELATED APPLICATION

This application is a continuation application of commonly assigned U.S. patent application Ser. No. 10/999,906, filed on Nov. 30, 2004, now U.S. Pat. No. 7,353,017 issued Apr. 1, 2008, and entitled "METHOD AND SYSTEM FOR PROVISIONING A WIRELESS DEVICE," which is hereby incorporated herein in its entirety by reference.

TECHNICAL FIELD

The described technology relates generally to subscribing to wireless services and particularly to provisioning a wireless device in accordance with subscribed-to services.

BACKGROUND

Users who want to subscribe to services of a wireless wide area network ("WWAN") typically have to complete a complicated series of steps. The device (e.g., personal computer, cell phone, or personal digital assistant) through which the services are to be accessed may have a wireless network interface card, such as a Global System Mobile ("GSM") card. When such a device is purchased by a user, the user typically has not subscribed to services of a service provider, and thus the wireless network interface card is not provisioned to access any service provider. To subscribe to the services of a service provider, the user may have to research the services of various service providers by locating and accessing the web sites of the service providers. Once the user has decided upon a service provider and a service, the user needs to subscribe to the service and obtain a subscriber identity module ("SIM") card that is provisioned with information provided by the service provider. A SIM card, which contains a subscriber identity that uniquely identifies the SIM card, is provisioned by storing in its memory information relating to registration information and activation service information for the selected service provider, which may be considered a "home" service provider. The registration information and activation service information may be stored on a network server, rather than in the memory of the SIM card. The activation information may include an access point name ("APN") for a subscribed-to service of the selected service provider. The device uses the registration information to notify a service provider that it is currently on and within range of the service provider's wireless network. The registered device uses the service activation information to notify the service provider that it wants to start accessing a subscribed-to service (e.g., access the internet). The provisioning may also include storing of information for other service providers that may be "home," "preferred," or "non-preferred" service providers. The selected service providers may have agreements with the other service providers to provide some of the services, for example, in an area not serviced by the selected service provider. For example, if the services of a home service provider are not currently available to a device, the device may try to activate a service of a preferred or non-preferred service provider. The user can then install the SIM card onto the GSM card to access the services of the service provider. However, to obtain such a SIM card, the user may need to go to a retail outlet of the service provider and subscribe to the service. Alternatively, the user may obtain the SIM card via mail order. Regardless of how the SIM card is obtained, the user typically needs a SIM card that is provisioned by a service provider in accordance with the selected service.

Some vendors of devices may provide a purchase option by which a purchaser of a device can subscribe to a service of a wireless service provider at the time the device is purchased. The purchaser may select a service provider and service that is made available by the vendor. The vendor coordinates the subscribing of the purchaser to the service and the provisioning of the SIM card with service provider and service information. The vendor then installs the provisioned SIM card into the device before it is delivered to the purchaser.

The selection of a service provider and a service at the time of purchase of the device limits both the timing of the subscription and the choice of service providers and services. Some vendors may require a purchaser to subscribe to a service at the time of purchase and limit the purchaser's options to certain service providers and services. At the time of purchase, a purchaser may not be ready to subscribe to a service (but may want the option of doing so later) or may not want to subscribe with the service providers or services that the vendor makes available. If the purchaser does not subscribe at the time of purchase, then later subscription requires the complicated series of steps as described above. It would be desirable to have a less complicated way of subscribing to wireless services that would offer a range of service providers and services and not necessarily be limited to subscribing at the time of purchase of a device.

SUMMARY

A method and system for controlling the provisioning of a device with information for accessing services of a wireless service provider via a wireless network is provided. The provisioning system allows a user to select a service provider and service and automatically provisions the device via the wireless network to access the selected service of the selected service provider. The provisioning system initially stores automatic provisioning information on the device that includes the identification of wireless service providers that have the capability to automatically provision the device. When a user of the device wants to subscribe to a service of a service provider, the provisioning system requests an automatic provisioning service of the selected service provider to provide information describing available services and information needed to subscribe to those services. When the user selects a service and provides the needed information, the provisioning system retrieves provisioning information for the selected service from the service provider. The provisioning system stores the provisioning information on the device so that the device can then be used to access the selected service of the service provider. The service provider also stores information to allow the access by the device.

DETAILED DESCRIPTION

Figure 1:
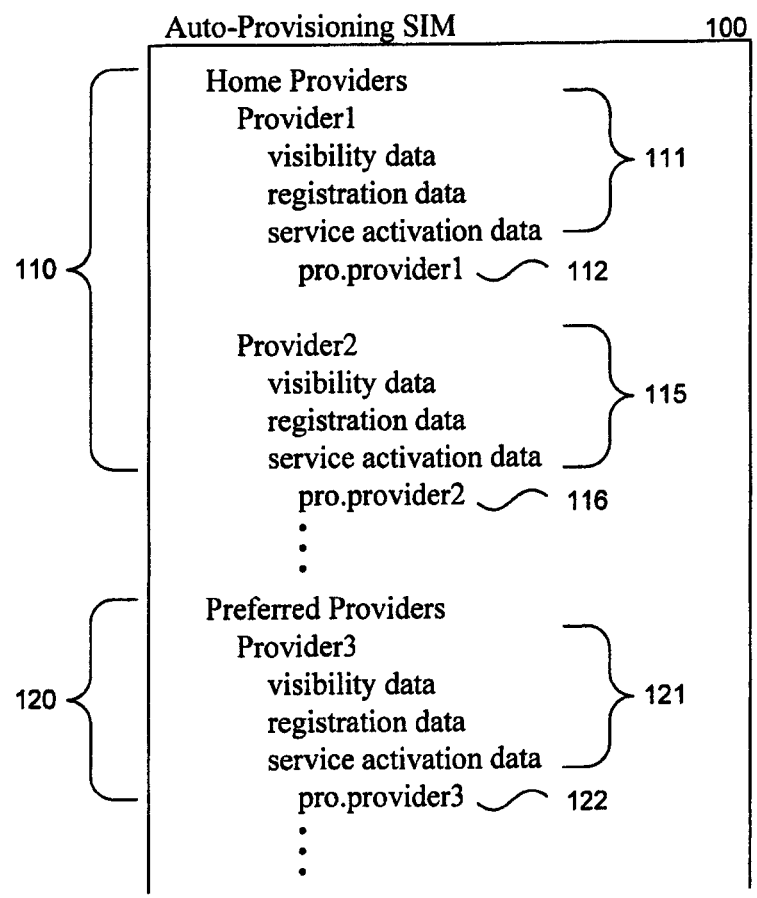
FIG. 1 is a diagram that illustrates the data structure of a service provider store portion of a SIM card that contains auto-provisioning information in one embodiment.

A method and system for controlling the provisioning of a device with information for accessing services of a wireless service provider via a wireless network is provided. In one embodiment, the provisioning system allows a user to select a service provider and service and automatically provision the device ("auto-provisioning") via the wireless network to access that service of the service provider. Thus, the user can select a service provider and service via their device and have the device provisioned at a time of their choosing without having to provide the device or a component of the device to an external provisioning entity. To effect the auto-provisioning, the provisioning system initially stores auto-provisioning information on the device or component of the device (e.g., a SIM card) typically before the device or component is purchased. The auto-provisioning information includes the identification of wireless service providers that have the capability to automatically provision the device. The auto-provisioning information may be stored in a service provider store of the device, such as in memory of a SIM card. The auto-provisioning information may include registration information and service activation information that may include an access point name ("APN") for an auto-provisioning service of the service provider. When a user of the device wants to subscribe to a service of a service provider, the provisioning system uses the auto-provisioning information of the service provider store to scan for visible service providers (i.e., whose wireless networks are currently within range of the device) that support auto-provisioning. The provisioning system may then provide a list of the visible service providers to the user so that the user can select a service provider and retrieve information about its services. Once the user has selected a service provider, the provisioning system registers with the service provider and then activates an auto-provisioning service of the service provider using an auto-provisioning access point name that may be stored in the service provider store. The provisioning system then requests the auto-provisioning service of the service provider to provide information describing available services and information (e.g., credit card number) needed from the user to subscribe to those services. The provisioning system allows the user to browse through descriptions of the available services and to select a service. The provisioning system also collects information from the user that is needed to subscribe to the service. The provisioning system provides the collected information to the service provider via the wireless network. The service provider may validate the request to subscribe (e.g., receive credit card charge authorization) and then update its databases to indicate that the user and/or device has subscribed to the service. The provisioning system then sends provisioning information for the subscribed-to service to the device. Upon receiving the provisioning information, the provisioning system stores the provisioning information in the service provider store. The device can then be used to access the services of the service provider in accordance with the information stored in the service provider store. In this way, a user can subscribe to services of the service provider after the device has been purchased and without the need to provide the device to an external entity for provisioning.

In one embodiment, the provisioning system may be used to subscribe to voice or data services of a service provider. Voice services, however, have generally used a different provisioning technique than data services. When used to subscribe to voice services, the provisioning system may store auto-provisioning information in the service provider store of the device as described above. When the service provider is requested to provide information about its services, the service provider may provide information describing its voice services. Once the user selects a voice service (e.g., including type of plan), the provisioning system notifies the service provider. The service provider can then use a different mechanism to provision the device in accordance with the selected voice service. Thus, the provisioning system can be use to guide the selection of voice services based on auto-provisioning information of a service provider store.

In one embodiment, the provisioning system may be used when the device or component of the device does not include auto-provisioning information when it is purchased. In such a case, the provisioning system can retrieve the auto-provisioning information in various ways and then store it at the device. To retrieve the auto-provisioning information, the provisioning system may scan for all visible providers of any service. The provisioning system then registers with the visible providers and requests the visible provider for a list of its services (e.g., APNs). When the list includes the APN for the auto-provisioning service, the provisioning system may store the APN for auto-provisioning at the device. Alternatively, when the device is within range of a provider, it may establish a session with the visible provider and request the visible provider to send its APN for auto-provisioning. The service provider may send its APN using the Unstructured Supplementary Services Data ("USSD") protocol of GSM. When the device receives the APN, it may store the APN at the device. The provisioning system can then auto-provision the device as described above using a retrieved APN.

FIG. 1 is a diagram that illustrates the data structure of a service provider store portion of a SIM card that contains auto-provisioning information in one embodiment. The service provider store 100 includes a home service providers data structure 110 and a preferred providers data structure 120. In addition, although not shown, the service provider store may also include a non-preferred providers data structure. The home service providers data structure includes auto-provisioning information 111 for Provider1 and auto-provisioning information 115 for Provider2. The auto-provisioning information includes visibility data, registration data, and service activation data. The service activation information may include an access point name such as "pro.provider1" 112 for the auto-provisioning service of Provider1 and "pro.provider2" 116 for the auto-provisioning service of Provider2. The preferred providers data structure includes auto-provisioning information 121 for Provider3. The service activation information may include an access point name such as "pro.provider3" 122 for the auto-provisioning service of Provider3.

Figure 2:
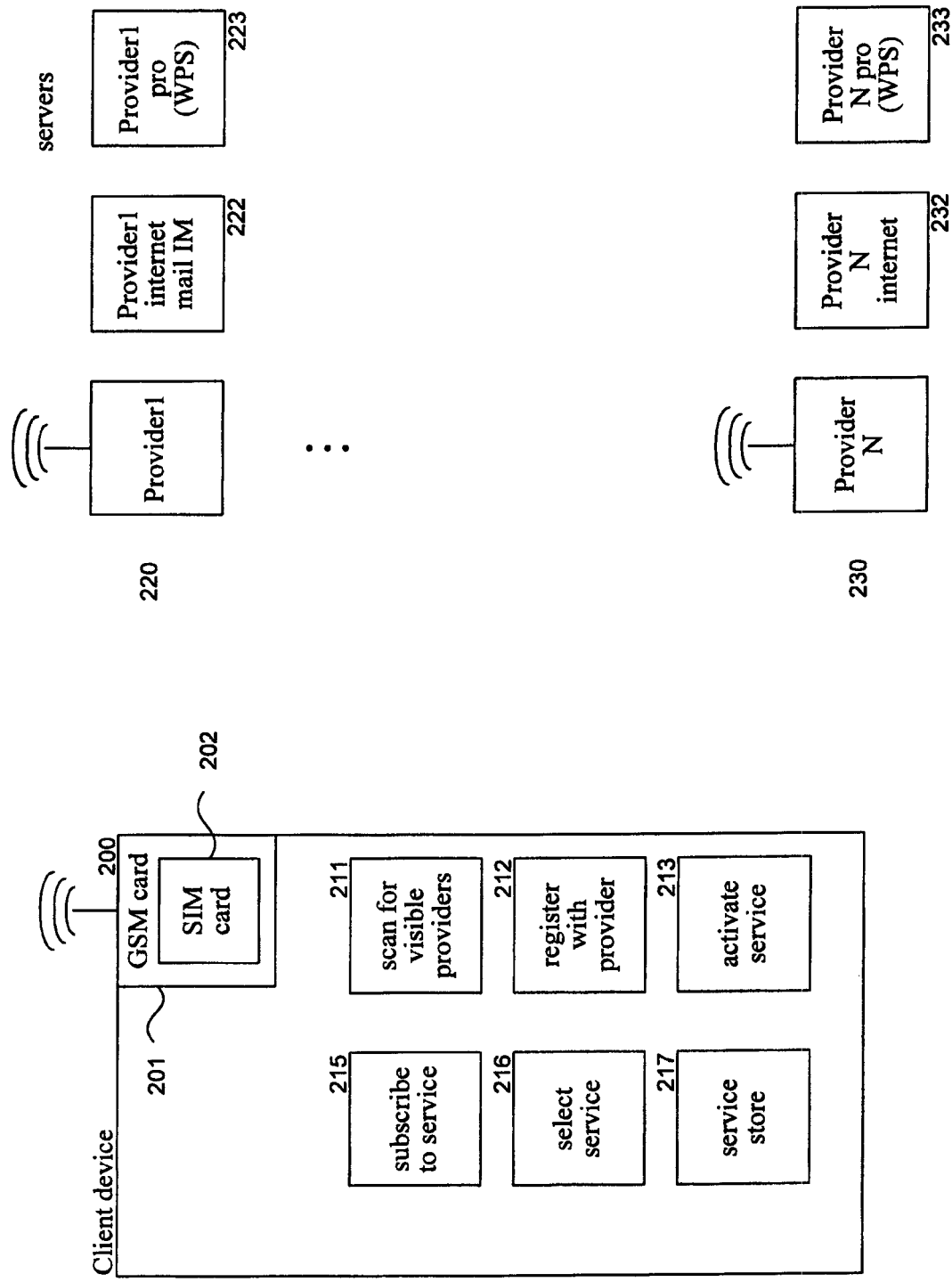
FIG. 2 is a block diagram that illustrates components of the provisioning system in one embodiment.

FIG. 2 is a block diagram that illustrates components of the provisioning system in one embodiment. The provisioning system includes server-side components and client-side components. The client device 200 includes a GSM card 201 and a SIM card 202. The client device includes a scan for visible providers component 211, a register with provider component 212, and an activate service component 213, which may be conventional components. The client-side components include a subscribe to service component 215, a select service component 216, and a service store 217. The subscribe to service component controls the auto-provisioning of a SIM card to enable services to which a user subscribes. The subscribe to service component invokes the scan for visible providers component to identify visible service providers. The subscribe to service component then compares the visible service providers with the auto-provisioning service providers identified on the SIM card. The subscribe to service component allows a user to select one of the visible service providers that provides an auto-provisioning capability. When a service provider is selected, the subscribe to service component invokes the register with provider component to register the device with the selected service provider. The subscribe to service component then invokes the activate service component to activate the auto-provisioning service for the selected service provider using the auto-provisioning access point name of the SIM card. The subscribe to service component then requests a description of the services from the selected service provider. The subscribe to service component receives the description along with an indication of information that is needed to subscribe to services of the selected service provider. The subscribe to service component may collect the descriptions of all the services of a service provider and store them locally. Such local storing will avoid delays caused by retrieving the descriptions on an as-needed basis. The subscribe to service component then invokes the select service component to display the descriptions of the various services to the user and allow the user to select a service. The subscribe to service component notifies the selected service provider of the service that has been selected. In response, the subscribe to service component receives the provisioning information from the service provider and stores that provisioning information in the service provider store of the SIM card to complete the provisioning of the client device for the subscribed-to service of the service provider.

On the server side, the service providers provide servers 220 and 230 to service requests of client devices. A service provider may provide a separate server for auto-provisioning services, Internet services, mail services, and so on, such as servers 222, 223, 232, and 233. The auto-provisioning servers contain the server-side components of the provisioning system. The server-side components receive requests to provide auto-provisioning services, provide descriptions of available services along with an indication of information needed to subscribe to a service, receive requests to subscribe to a service, update databases to reflect the subscription to the service, and provide provisioning information to the device for use in accessing the subscribed-to service.

The devices and servers on which the provisioning system is implemented may include a central processing unit, memory, input devices (e.g., keyboard and pointing devices), output devices (e.g., display devices), and storage devices (e.g., disk drives). The memory and storage devices are computer-readable media that may contain instructions that implement the provisioning system. In addition, the data structures and message structures may be stored or transmitted via a computer-readable medium, such as a signal on a communications link.

The provisioning system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The client computer systems may be cell phones, personal digital assistants, smart phones, personal computers, programmable consumer electronics, digital cameras, and so on.

The provisioning system may be described in the general context of computer-executable instructions, such as program modules that may be executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
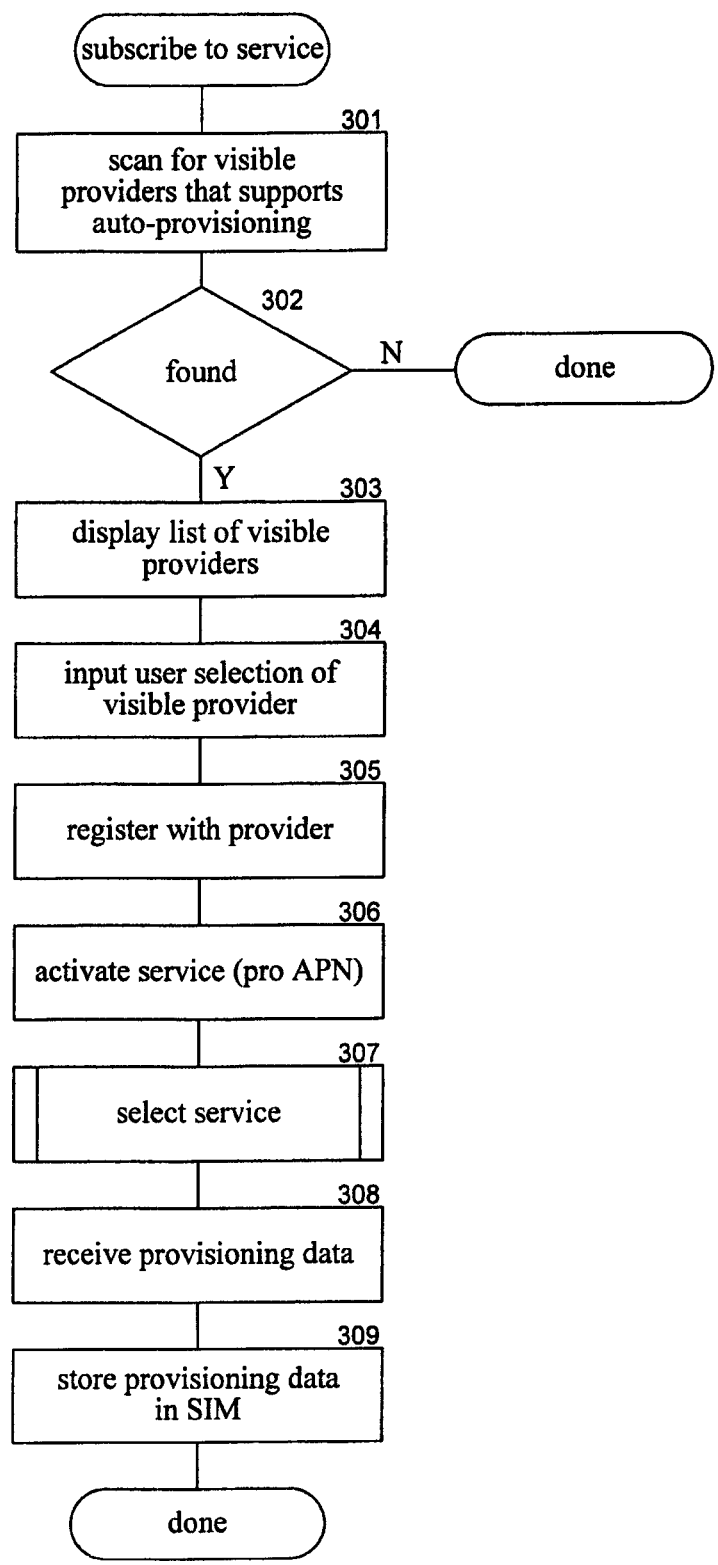
FIG. 3 is a flow diagram that illustrates the processing of the subscribe to service component in one embodiment.

FIG. 3 is a flow diagram that illustrates the processing of the subscribe to service component in one embodiment. The component may be invoked when, for example, a user requests to subscribe to a service of a service provider. In block 301, the component scans for visible service providers and may use conventional scanning techniques. In decision block 302, the component compares the visible service providers to the auto-provisioning service providers of the service provider store. If an auto-provisioning service provider is visible, then the component continues at block 303, else the component completes because no visible service provider provides auto-provisioning service for this device. In block 303, the component displays a list of visible service providers that provide an auto-provisioning service. In block 304, the component inputs a user selection of a visible service provider. In block 305, the component registers with the selected service provider. In block 306, the component activates the auto-provisioning service of the selected service provider. The access point name for the auto-provisioning service may be retrieved from the service provider store. Alternatively, a standard access point name for auto-provisioning services may be used for all service providers. In block 307, the component invokes the select service component to control the selection of a service and service provider by a user. In block 308, the component requests and receives provisioning information from the selected service provider. In block 309, the component stores the provisioning information in the service provider store to complete the provisioning of the device. The component then returns.

Figure 4:
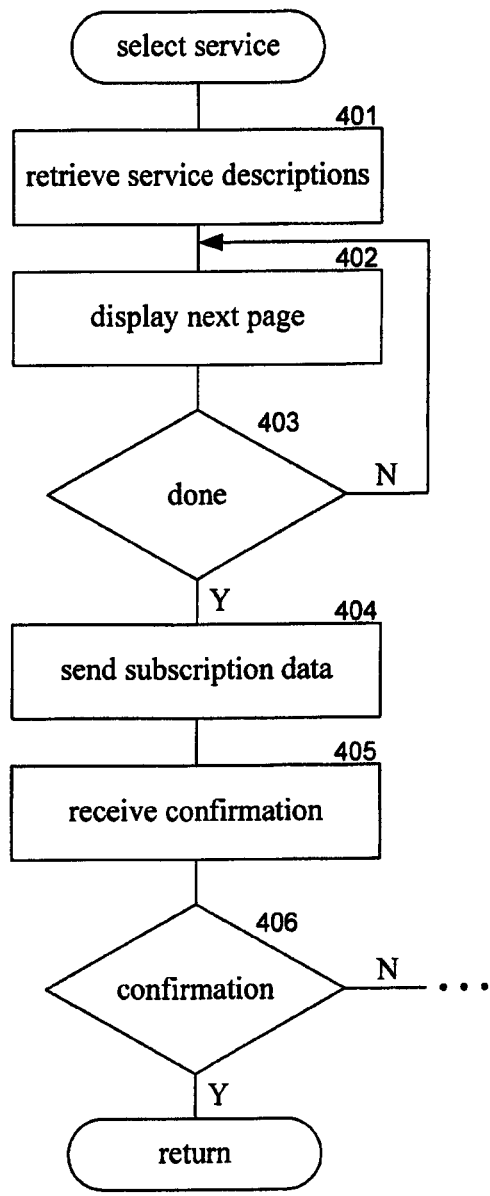
FIG. 4 is a flow diagram that illustrates the processing of the select service component in one embodiment.

FIG. 4 is a flow diagram that illustrates the processing of the select service component in one embodiment. The component is invoked after a device has activated the auto-provisioning service of a service provider. In block 401, the component retrieves the descriptions of the services provided by the service provider along with an indication of subscription information that is to be collected from the user (or the device) to subscribe to a service. The description and the indication may be provided in an eXtensible Markup Language ("XML") format. In blocks 402-403, the component loops displaying pages of information describing available services and collecting subscription information. In block 402, the component displays the next display page. In decision block 403, if the display of the display pages is complete, then the component continues at block 404, else the component loops to block 402 to display the next display page. In block 404, the component sends the subscription information to the service provider. In block 405, the component receives confirmation as to whether the service provider will provide the requested service. For example, the service provider may not provide the requested service if it could not receive authorization to charge a credit card account identified by the subscription information or if the device cannot support the requested service. In decision block 406, if confirmation has been received, then the component returns, else the component takes the appropriate steps to notify the user and may repeat the process of collecting subscription information.

From the foregoing, it will be appreciated that although specific embodiments of the provisioning system have been described herein for purposes of illustration, various modifications may be made without deviating from the spirit and scope of the invention. One skilled in the art will appreciate that the provisioning system can be used to subscribe to additional services of a service provider after the device has been automatically provisioned for one or more services of the service provider. The provisioning system can also be used to subscribe to services of different service providers even after the initial auto-provisioning is complete. Similarly, even if a device is delivered to a user with provisioning for a desired service of a desired service provider, the provisioning system can be used to change services or service providers. The provisioning system may allow for various levels of user selection of options. For example, the service provider store of a device may be provisioned with the auto-provisioning information of only one service provider. In such a case, the user would not have a choice of service provider and thus would not need to select a service provider and possibly service, but would have the choice of when to subscribe to a service of that service provider. The provisioning system may be used with wireless networks that use standards other than GSM. For example, the provisioning system can be used with CDMA-based wireless networks. Accordingly, the invention is not limited except as by the appended claims.

We claim:

1. A method in a device for provisioning the device with information for subscribing to a service provided by a service provider via a wireless network, the device having a service provider store, the method comprising:
    providing in the service provider store auto-provisioning information for a plurality of service providers that support at least one of a plurality of techniques for auto-provisioning devices;
    scanning for visible service providers that support at least one of the plurality of techniques for auto-provisioning as indicated by the service provider store, wherein the scanning identifies a plurality of visible service providers;
    displaying at least a portion of a list of visible service providers identified by the scanning;
    receiving from a user a selection of a visible service provider;
    registering with the user-selected visible service provider; and
    after registering with the user-selected visible service provider,
        retrieving service description information from the user-selected visible service provider, the retrieved service description information including a description of a first service provided by the user-selected visible service provider and an indication of information to collect from the user to subscribe to the first service and further including a description of a second service provided by the user-selected visible service provider and an indication of information to collect from the user to subscribe to the second service,
        displaying at least a portion of a list of services provided by the user-selected visible service provider, wherein the list of services provided by the user-selected visible service provider includes the first service and the second service,
        receiving a selection of a service provided by the user-selected visible service provider,
        notifying the user-selected visible service provider of the selection of the selected service,
        receiving from the user-selected visible service provider provisioning information for the selected service, and
        storing in the service provider store the received provisioning information so that the device can access the selected service of the user-selected visible service provider based on the provisioning information of the service provider store.

2. The method of claim 1 wherein the device includes a wireless connection card that includes the service provider store.

3. The method of claim 2 wherein the wireless connection card is a global system mobile card and the service provider store is contained within a subscriber identity module.

4. The method of claim 1 wherein the description of the first service and the indication of information to collect from the user to subscribe to the first service are provided in an XML format.

5. The method of claim 1 wherein the received provisioning information for the selected service includes an access point name for the selected service.

6. The method of claim 1 wherein auto-provisioning information for a service provider includes registration information and service activation information that includes an access point name for an auto-provisioning service of the service provider.

7. The method of claim 1 wherein the device is a computing device.

8. The method of claim 1 wherein the device is a mobile device.

9. The method of claim 1 wherein the information to collect from the user to subscribe to the first service is a credit card number.

10. The method of claim 1 wherein the service provider provides services via a global system mobile network.

11. The method of claim 1 wherein the auto-provisioning information is provided to the device using an unstructured supplementary services data protocol.

12. The method of claim 1 wherein the received provisioning information comprises registration information.

13. The method of claim 1 wherein the received provisioning information comprises service activation data.

14. A computer-readable memory containing instructions for provisioning a device with information for subscribing to a service provided by a service provider via a wireless network, the device having a service provider store, the instructions comprising:
    instructions for providing in the service provider store auto-provisioning information for a plurality of service providers that support at least one of a plurality of techniques for auto-provisioning devices;
    instructions for scanning for visible service providers that support at least one of the plurality of techniques for auto-provisioning as indicated by the service provider store, wherein the scanning identifies a plurality of visible service providers;
    instructions for displaying at least a portion of a list of visible service providers identified by the scanning;
    instructions for receiving from a user a selection of a visible service provider;
    instructions for registering with the user-selected visible service provider; and
    instructions for, after registering with the user-selected visible service provider,
        retrieving service description information from the user-selected visible service provider, the retrieved service description information including a description of a first service provided by the user-selected visible service provider and an indication of information to collect from the user to subscribe to the first service and further including a description of a second service provided by the user-selected visible service provider and an indication of information to collect from the user to subscribe to the second service,
        displaying at least a portion of a list of services provided by the user-selected visible service provider, wherein the list of services provided by the user-selected visible service provider includes the first service and the second service,
        receiving a selection of a service provided by the user-selected visible service provider, notifying the user-selected visible service provider of the selection of the selected service, receiving from the user-selected visible service provider provisioning information for the selected service, and storing in the service provider store the received provisioning information so that the device can access the selected service of the user-selected visible service provider based on the provisioning information of the service provider store.

15. The computer-readable memory of claim 14 wherein the device includes a wireless connection card that includes the service provider store.

16. The computer-readable memory of claim 15 wherein the wireless connection card is a global system mobile card and the service provider store is contained within a subscriber identity module.

17. The computer-readable memory of claim 14 wherein the received provisioning information for the selected service includes an access point name for the selected service.

18. The computer-readable memory of claim 14 wherein auto-provisioning information for a service provider includes registration information and service activation information that includes an access point name for an auto-provisioning service of the service provider.

19. The computer-readable memory of claim 14 wherein the device is a mobile device.

20. The computer-readable memory of claim 14 wherein the information to collect from the user to subscribe to the first service is a credit card number.

21. The computer-readable memory of claim 14 wherein the service provider provides services via a global system mobile network.

22. The computer-readable memory of claim 14 wherein the auto-provisioning information is provided to the device using an unstructured supplementary services data protocol.

23. The computer-readable memory of claim 14 wherein the received provisioning information comprises registration information.

24. The computer-readable memory of claim 14 wherein the received provisioning information comprises service activation data.

25. A computing system, having a memory and a processor, for provisioning a device with information for subscribing to a service provided by a service provider via a wireless network, the device having a service provider store, the computing system comprising:

a component configured to provide, in the service provider store, auto-provisioning provisioning information for a plurality of service providers that support at least one of a plurality of techniques for auto-provisioning devices;

a component configured to scan for visible service providers that support at least one of the plurality of techniques for auto-provisioning as indicated by the service provider store, wherein the scanning identifies a plurality of visible service providers;

a component configured to display at least a portion of a list of visible service providers identified by the scanning;

a component configured to receive from a user a selection of a visible service provider;

a component configured to register with the user-selected visible service provider; and a component configured to, after registering with the user-selected visible service provider, retrieve service description information from the user-selected visible service provider, the retrieved service description information including a description of a first service provided by the user-selected visible service provider and an indication of information to collect from the user to subscribe to the first service and further including a description of a second service provided by the user-selected visible service provider and an indication of information to collect from the user to subscribe to the second service, display at least a portion of a list of services provided by the user-selected visible service provider, wherein the list of services provided by the user-selected visible service provider includes the first service and the second service, receive a selection of a service provided by the user-selected visible service provider, notify the user-selected visible service provider of the selection of the selected service, receive from the user-selected visible service provider provisioning information for the selected service, and store in the service provider store the received provisioning information so that the device can access the selected service of the user-selected visible service provider based on the provisioning information of the service provider store wherein at least one of the components comprises computer-executable instructions stored in the memory for execution by the processor.

26. The computing system of claim 25 wherein the device includes a wireless connection card that includes the service provider store.

27. The computing system of claim 26 wherein the wireless connection card is a global system mobile card and the service provider store is contained within a subscriber identity module.

28. The computing system of claim 25 wherein the received provisioning information for the selected service includes an access point name for the selected service.

29. The computing system of claim 25 wherein auto-provisioning information for a service provider includes registration information and service activation information that includes an access point name for an auto-provisioning service of the service provider.

30. The computing system of claim 25 wherein the device is a mobile device.

31. The computing system of claim 25 wherein the information to collect from the user to subscribe to the first service is a credit card number.

32. The computing system of claim 25 wherein the service provider provides services via a global system mobile network.

33. The computing system of claim 25 wherein the auto-provisioning information is provided to the device using an unstructured supplementary services data protocol.

34. The computing system of claim 25 wherein the received provisioning information comprises registration information or service activation data.

* * * * *